(12) United States Patent
Matsushima

(10) Patent No.: US 11,221,527 B2
(45) Date of Patent: Jan. 11, 2022

(54) OPTICAL ELEMENT AND LIQUID CRYSTAL DISPLAY APPARATUS

(71) Applicant: Japan Display Inc., Tokyo (JP)

(72) Inventor: Toshiharu Matsushima, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/927,317

(22) Filed: Jul. 13, 2020

(65) Prior Publication Data

US 2021/0018778 A1    Jan. 21, 2021

(30) Foreign Application Priority Data

Jul. 17, 2019  (JP) .............................. JP2019-131794

(51) Int. Cl.
| | | |
|---|---|---|
| *G02F 1/1347* | (2006.01) | |
| *G02F 1/1335* | (2006.01) | |
| *G02F 1/1343* | (2006.01) | |
| *G02F 1/137* | (2006.01) | |
| *G02F 1/139* | (2006.01) | |

(52) U.S. Cl.
CPC ............ *G02F 1/1347* (2013.01); *G02F 1/137* (2013.01); *G02F 1/1396* (2013.01); *G02F 1/133504* (2013.01); *G02F 1/133512* (2013.01); *G02F 1/133514* (2013.01); *G02F 1/133528* (2013.01); *G02F 1/134309* (2013.01); *G02F 1/13706* (2021.01); *G02F 1/13712* (2021.01); *G02F 1/133531* (2021.01)

(58) Field of Classification Search
CPC ............. G02F 1/133528; G02F 1/1347; G02F 1/133531; G02F 1/134372; G02F 1/134309; G02F 1/13706; G02F 1/13712
See application file for complete search history.

(56) References Cited

U.S. PATENT DOCUMENTS

2013/0038811 A1*  2/2013  Sugita ............... G02F 1/133528
                                                             349/61
2013/0100388 A1   4/2013  Matsushima
(Continued)

FOREIGN PATENT DOCUMENTS

| JP | H06-138469 A | 5/1994 |
|---|---|---|
| JP | H09-281330 A | 10/1997 |
| JP | 2013-109309 A | 6/2013 |

*Primary Examiner* — Michael H Caley
*Assistant Examiner* — Jonathan Y Jung
(74) *Attorney, Agent, or Firm* — Michael Best & Friedrich LLP

(57) ABSTRACT

A viewing angle of emission light is widened. A width of the viewing angle is adjusted. A liquid crystal diffraction grating includes at least a first substrate, a liquid crystal layer and a second substrate. The first substrate includes a lower electrode and an upper electrode opposite to the lower electrode, and the upper electrode includes a plurality of branch electrodes that extend in a Y direction and are arranged in an X direction in a plan view. When no voltage is applied to the plurality of branch electrodes, an alignment direction of liquid crystal molecules of the liquid crystal layer is a direction along the X or Y direction. When polarizers are arranged on upper and lower sides of the liquid crystal diffraction grating, transmission axes of these polarizers are parallel to each other and parallel to the alignment direction of the liquid crystal molecules.

7 Claims, 15 Drawing Sheets

(56) References Cited

U.S. PATENT DOCUMENTS

| | | | |
|---|---|---|---|
| 2014/0204292 A1* | 7/2014 | Liao | G02B 30/28 349/15 |
| 2015/0070607 A1* | 3/2015 | Usukura | G02F 1/133345 349/15 |
| 2016/0187684 A1* | 6/2016 | Zhang | G02F 1/134309 349/42 |
| 2016/0291338 A1* | 10/2016 | Ochiai | G02B 30/27 |
| 2019/0094625 A1* | 3/2019 | Haseba | G02F 1/133512 |

* cited by examiner

A-A CROSS-SECTIONAL SURFACE

FIG. 5
BEFORE VOLTAGE APPLICATION
(INITIAL ALIGNMENT)
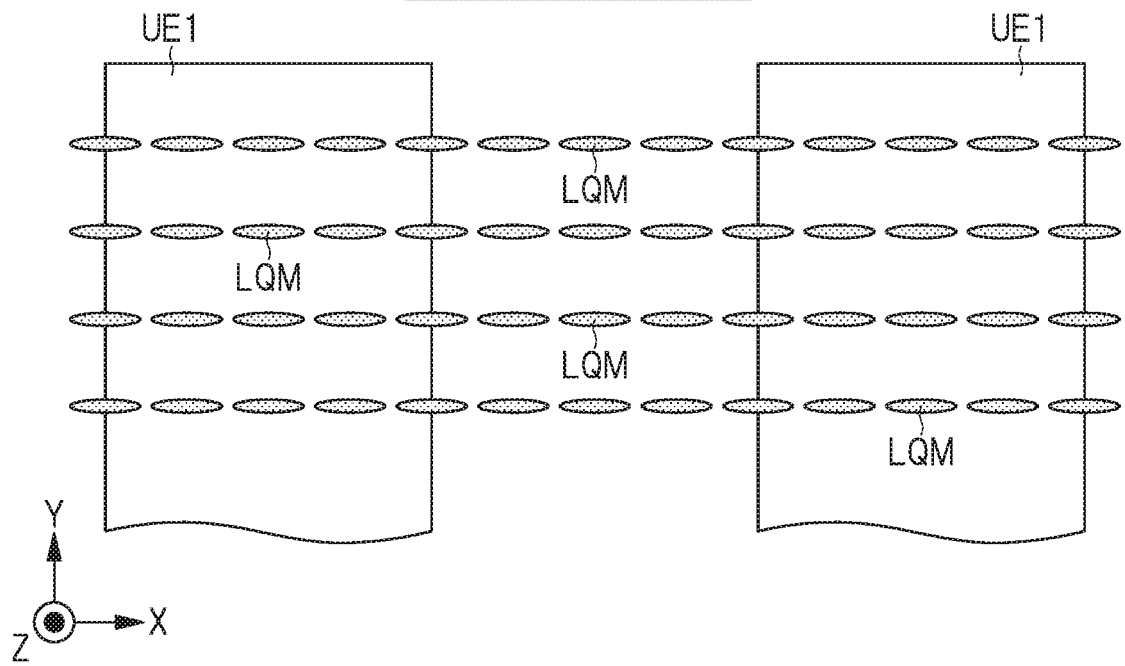
AFTER VOLTAGE APPLICATION
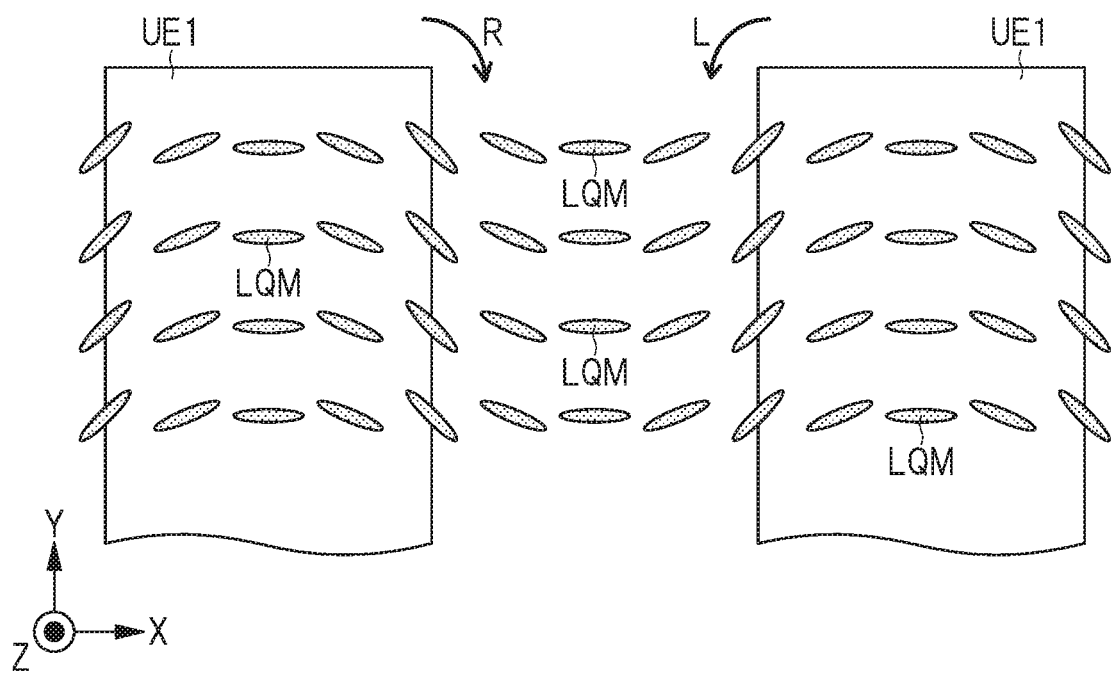

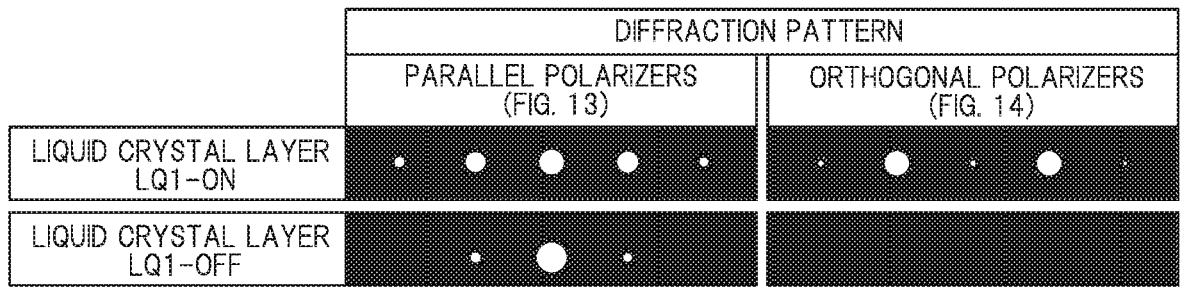
FIG. 15
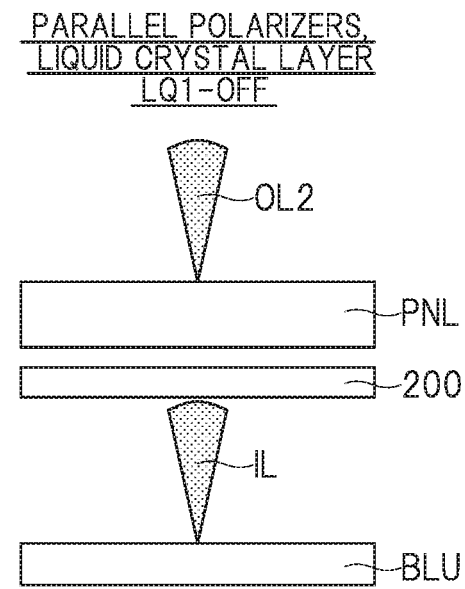
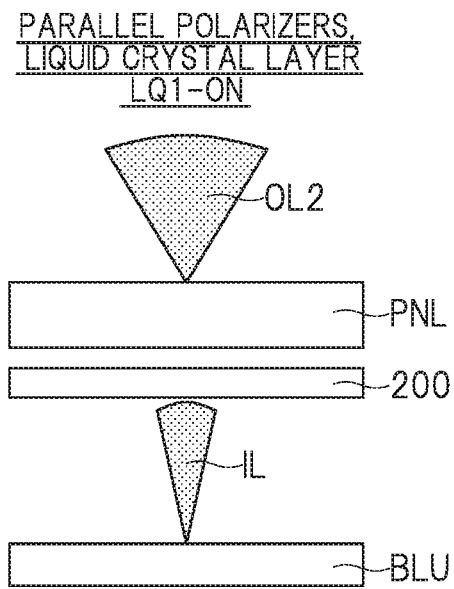
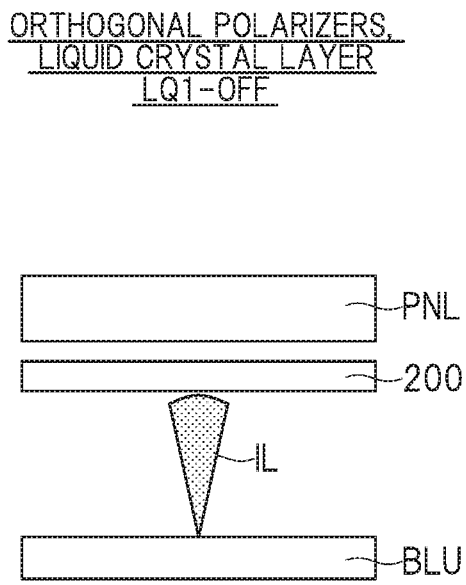
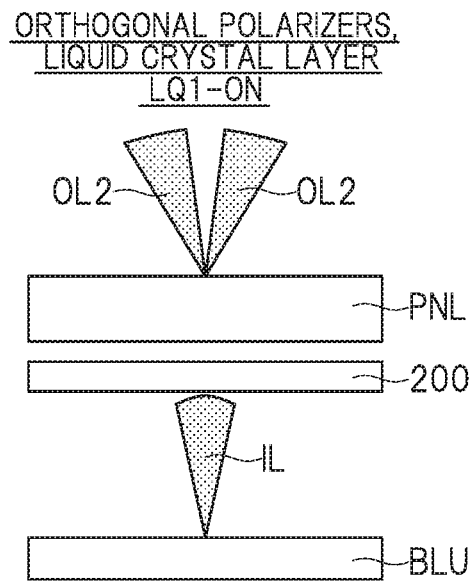
FIG. 16

FIG. 20

| | DIFFRACTION PATTERN (PARALLEL POLARIZERS) | |
|---|---|---|
| | LIGHT-POLARIZATION CONVERTING ELEMENT TN-ON | LIGHT-POLARIZATION CONVERTING ELEMENT TN-OFF |
| LIQUID CRYSTAL LAYER LQ1-ON | · ● ● ● · | · ● ● · |
| LIQUID CRYSTAL LAYER LQ1-OFF | · ● · | |

FIG. 21

| | DIFFRACTION PATTERN (ORTHOGONAL POLARIZERS) | |
|---|---|---|
| | LIGHT-POLARIZATION CONVERTING ELEMENT TN-ON | LIGHT-POLARIZATION CONVERTING ELEMENT TN-OFF |
| LIQUID CRYSTAL LAYER LQ1-ON | · ● · ● · | · ● ● ● · |
| LIQUID CRYSTAL LAYER LQ1-OFF | | · ● · |

FIG. 22
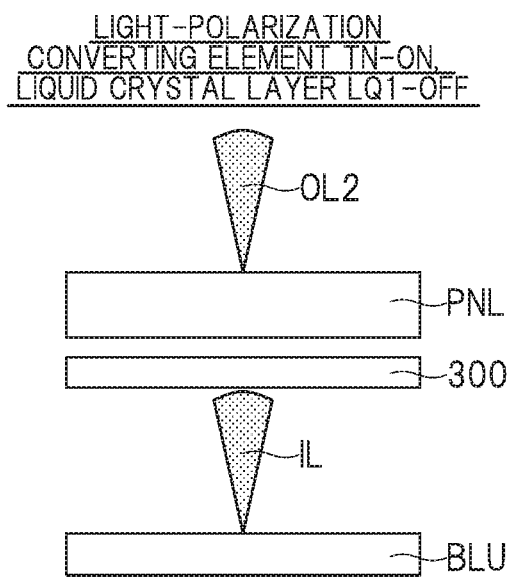
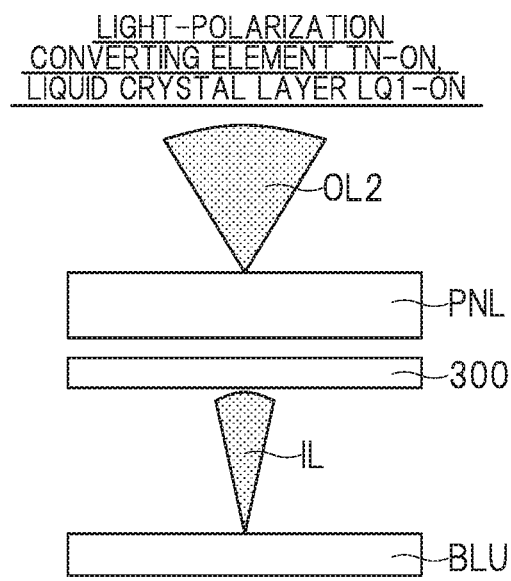
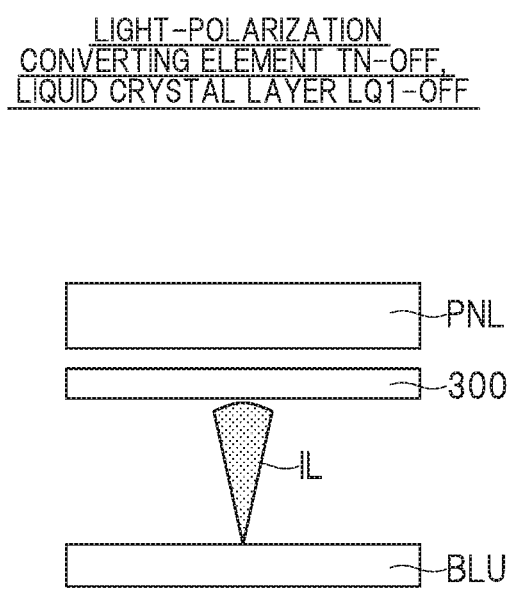
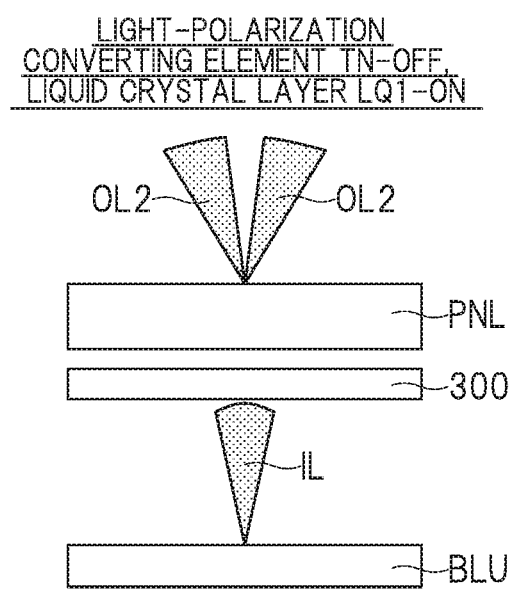

OPTICAL ELEMENT AND LIQUID CRYSTAL DISPLAY APPARATUS

CROSS-REFERENCE TO RELATED APPLICATION

The present application claims priority from Japanese Patent Application No. 2019-131794 filed on Jul. 17, 2019, the content of which is hereby incorporated by reference into this application.

TECHNICAL FIELD OF THE INVENTION

The present invention relates to an optical element and a liquid crystal display apparatus, and, more particularly relates to an optical element with a diffraction grating function including a liquid crystal layer, a light emission direction of which can be controlled by application of a voltage to an electrode.

BACKGROUND OF THE INVENTION

Japanese Patent Application Laid-Open Publication No. H09-281330 (Patent Document 1) discloses a liquid crystal diffraction grating using a liquid crystal layer, and discloses a technique of providing the liquid crystal layer with a portion having twist structure and a vertically-aligned portion.

Japanese Patent Application Laid-Open Publication No. H06-138469 (Patent Document 2) discloses a liquid crystal panel using a liquid crystal layer, and discloses a technique of making difference between a diffractive index of the liquid crystal layer above a pixel electrode and a diffractive index thereof in a portion between adjacent pixel electrodes at the time of voltage application.

Japanese Patent Application Laid-Open Publication No. 2013-109309 (Patent Document 3) discloses a liquid crystal panel having an alignment method of inversely rotating liquid crystal molecules of ends of adjacent common electrodes at the time of voltage application.

SUMMARY OF THE INVENTION

In a display apparatus including a panel with a liquid crystal layer or others, a light source such as a backlight unit is provided below the panel in some cases. Since the light being emitted from the backlight unit travels through the liquid crystal layer inside the panel and is emitted from an upper side of the panel, a technique of widening a viewing angle of the emission light by control of alignment of liquid crystals inside the panel has been studied. However, since it is necessary to increase a response speed of the panel or decrease a power consumption of the same, it is necessary to not only take the viewing angle in consideration but also take a balance with these properties at a stage of development of the panel. Accordingly, a technique capable of widening the viewing angle by a structure other than the panel is desired, and a technique capable of freely adjusting the viewing angle is desired.

Other objects and novel characteristics will be apparent from the description of the present specification and the accompanying drawings.

An optical element according to one embodiment includes a first polarizer, a first substrate, a first liquid crystal layer, a second substrate and a second polarizer, that are sequentially layered. In this case, the first substrate includes a first electrode and a second electrode opposite to the first electrode, and the second electrode includes a plurality of branch electrodes extending in a first direction and arranged in a second direction that is orthogonal to the first direction in a plan view. When no voltage is applied to the second electrode, an alignment direction of liquid crystal molecules of the first liquid crystal layer is a direction along the first direction or the second direction, and a transmission axis of the first polarizer and a transmission axis of the second polarizer are parallel to each other and parallel to the alignment direction of the liquid crystal molecules.

BRIEF DESCRIPTIONS OF THE DRAWINGS

FIG. 5 is a plan view showing rotation of liquid crystal molecules according to the first embodiment;

FIG. 15 is a schematic view showing a diffraction pattern according to the second embodiment;

FIG. 16 is a schematic view showing a display apparatus according to a second modification example;

FIG. 20 is a schematic view showing a diffraction pattern according to the third embodiment;

FIG. 21 is a schematic view showing a diffraction pattern according to the third embodiment; and FIG. 22 is a schematic view showing a display apparatus according to a third modification example.

DESCRIPTIONS OF THE PREFERRED EMBODIMENTS

Figure 1:
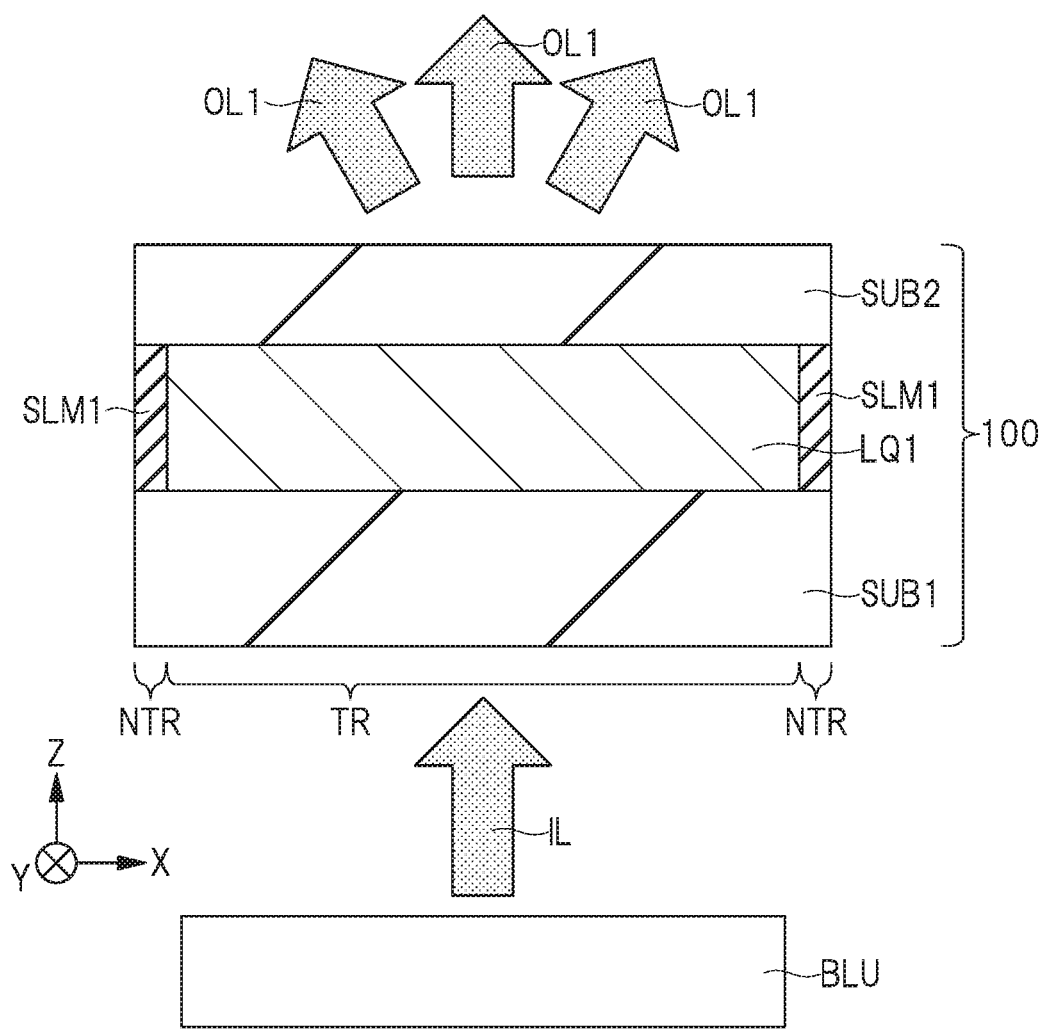
FIG. 1 is a schematic view showing a liquid crystal diffraction grating according to a first embodiment.

Hereinafter, each embodiment of the present invention will be described with reference to the accompanying drawings. Note that disclosure shows only one example, and appropriate modification with keeping the concept of the present invention which can be easily anticipated by those who are skilled in the art is obviously within the scope of the present invention. Also, in order to make the clear description, a width, a thickness, a shape, and others of each portion in the drawings are schematically illustrated more than those in an actual aspect in some cases. However, the illustration is only one example, and does not limit the interpretation of the present invention. In the present specification and each drawing, similar elements to those described earlier for the already-described drawings are denoted with the same or similar reference characters, and detailed description for them is appropriately omitted in some cases.

Note that an "X" direction and a "Y" direction that are explained in the present application are orthogonal to each other, and a plane that is made by the X direction and the Y direction becomes a horizontal plane. A "Z" direction is a vertical direction that is orthogonal to the X direction and the Y direction and that is vertical to the horizontal plane. In the present application, the Z direction is explained as a thickness direction of a structure in some cases.

In drawings for use in the embodiments, for easily understanding the drawings, hatching is omitted even in a cross-sectional view while hatching is added even in a plan view in some cases.

First Embodiment

<Structure of Liquid Crystal Diffraction Grating (Optical Element) 100>

With reference to FIGS. 1 to 8, a structure of a liquid crystal diffraction grating 100 will be explained as an example of an optical element according to a first embodiment.

As shown in FIG. 1, the liquid crystal diffraction grating 100 includes a substrate SUB1, a substrate SUB2 arranged above the substrate SUB1, and a liquid crystal layer (electric optical layer) LQ1 formed between the substrate SUB1 and the substrate SUB2. Each of the substrate SUB1 and the substrate SUB2 includes a transparent substrate, an insulating film, a conductive film or others, that are described later, and is made of a material having transparency that allows the visible light to penetrate therethrough.

In order to seal the liquid crystal layer LQ1 and improve adhesiveness between the substrate SUB1 and the substrate SUB2, a sealing member SLM1 is formed between the substrate SUB1 and the substrate SUB2. The sealing member SLM1 does not have the transparency that allows the visible light to penetrate therethrough. Therefore, the liquid crystal diffraction grating 100 includes a transparent region TR contributing to the light transmission and a non-transparent region NTR formed on an outer perimeter of the transparent region TR and not contributing to the light transmission. That is, the non-transparent region NTR is a region where the sealing member SLM1 is formed. The transparent region TR has a plurality of scan lines and a plurality of signal lines that are arranged in a matrix form, and has a plurality of pixel regions each of which is surrounded by a pair of scan lines and a pair of signal lines. In the pixel regions, upper electrodes described later are formed, respectively. By a potential applied to each of the upper electrodes, rotation of the liquid crystal molecules of the liquid crystal layer LQ1 is controlled.

For example, incident light IL that is emitted from a backlight unit BLU that is a light source arranged below the substrate SUB1 penetrates through the transparent region TR of the substrate SUB1, and is diffracted inside the liquid crystal layer LQ1. The light that has penetrated through the liquid crystal layer LQ1 is emitted as emission light (diffraction light) OL1 from the substrate SUB2. In this case, since the alignment of the liquid crystal layer LQ1 is changed by a state (ON or OFF) of a voltage applied to the liquid crystal diffraction grating 100, the emission light OL1 having a different viewing angle depending on the alignment state can be obtained.

Figure 2:
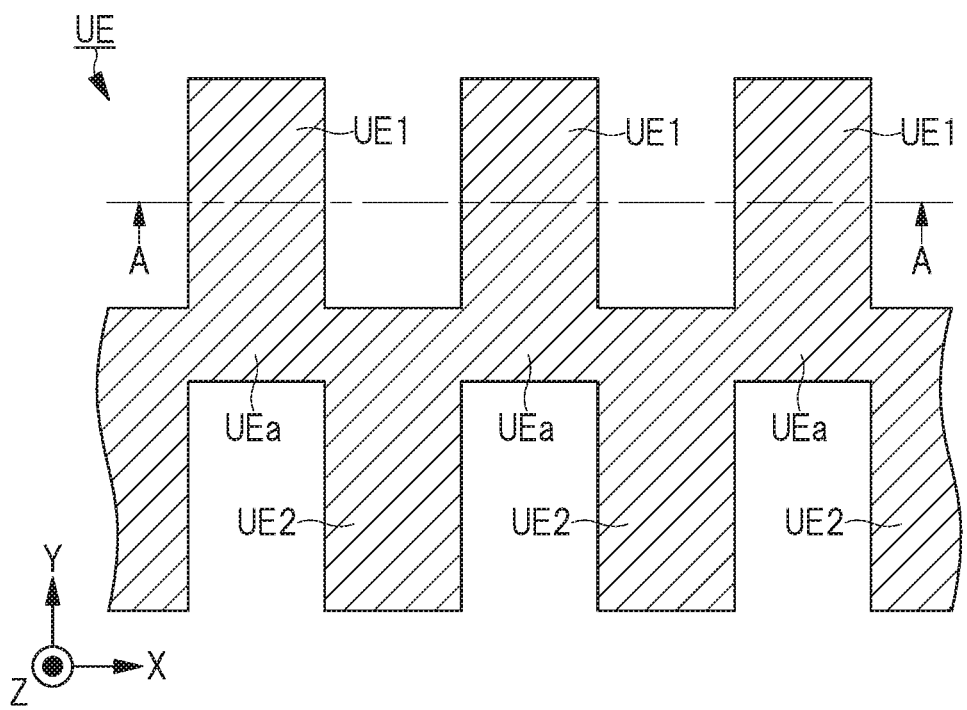
FIG. 2 is a plan view of a principal part showing the liquid crystal diffraction grating according to the first embodiment.

FIG. 2 is a plan view of a principal part showing a planar shape of an upper electrode UE included in the substrate SUB1. In the substrate SUB1, the upper electrode UE having such a shape is arranged for each of the pixel regions.

As shown in FIG. 2, the upper electrode UE includes a plurality of branch electrodes UE1 and UE2, and the plurality of branch electrodes UE1 and UE2 extend in the Y direction and are adjacent to each other in the X direction in a plan view. The plurality of branch electrodes UE1 are connected to each other by a joint portion UEa extending in the X direction, and the plurality of branch electrodes UE2 are also connected to each other by the joint portion UEa. The plurality of branch electrodes UE1 and the plurality of branch electrodes UE2 are arranged to have a houndstooth form in which they are adjacent to each other in the Y direction through the joint portion UEa while being shifted in its position from each other by a half pitch in the X direction.

Note that the plurality of branch electrodes UE1, the plurality of branch electrodes UE2 and the joint portion UEa are conductive films formed in the same layer as one another, and the following explanation will be made by mainly using the plurality of branch electrodes UE1. Although not illustrated, a lower electrode LE is formed in a planar form over an entire upper surface of the substrate SUB1 so that the plurality of upper electrodes UE1, the plurality of upper electrode UE2 and the joint portion UEa are opposite to the lower electrode LE and overlap the lower electrode LE in a plan view.

Figure 3:
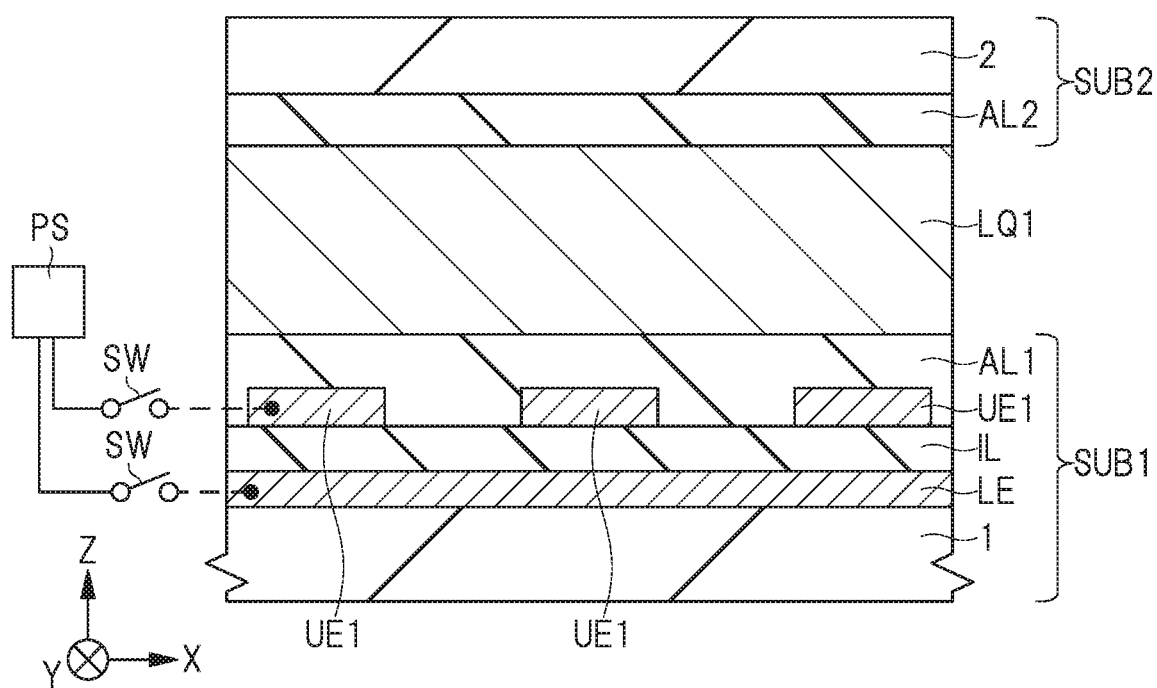
FIG. 3 is a cross-sectional view of a principal part showing the liquid crystal diffraction grating according to the first embodiment.

FIG. 3 is a cross-sectional view along a line A-A of FIG. 2, and is a cross-sectional view showing a detailed internal structure of the transparent region TR of the liquid crystal diffraction region 100.

The substrate SUB1 includes a supporting substrate (insulating substrate) 1. The supporting substrate 1 is, for example, a glass substrate or a transparent resin substrate. On the supporting substrate 1, the lower electrode LE is formed. The lower electrode LE is made of a high-transparent conductive material that is a metal oxide such as ITO (Indium Tin Oxide) or IZO (Indium Zinc Oxide).

Above the lower electrode LE, an insulating film IL is formed. The insulating film IL is an inorganic insulating film such as a silicon nitride (SiN) film, a silicon oxide (SiO) film, a silicon oxynitride (SiON) film or an aluminum oxide (AlOx) film. Alternatively, the insulating film IL may be, for example, an organic insulating film such as an acrylic resin film, or a layered film of the inorganic insulating film and the organic insulating film.

Above the insulating film IL, the upper electrode UE1 is formed. A material making up the upper electrode UE1 is the same as that of the lower electrode LE. The insulating film IL that is positioned between the upper electrode UE1 and the lower electrode LE functions as a capacitive insulating film.

Above the insulating film IL, an alignment film AL1 is formed so as to cover the upper electrode UE1 and be in contact with the liquid crystal layer LQ1. The alignment film AL1 is an organic insulating film made of a resin material such as polyimide. The alignment film AL1 is subjected to an alignment treatment such as rubbing or photo-alignment. Therefore, the alignment film AL1 has a function of equalizing initial alignment directions of the liquid crystal molecules contained in the liquid crystal layer LQ1.

The substrate SUB2 includes a supporting substrate (insulating substrate) 2 having a property that allows the visible light to penetrate therethrough. A material making up the supporting substrate 2 is the same as that of the supporting substrate 1. The alignment film AL2 is in contact with the liquid crystal layer LQ1, and is formed between the liquid crystal layer LQ1 and the supporting substrate 2. The alignment film AL2 is made of the same material as that of the alignment film AL1, and has the same function as that of the alignment film AL1.

Note that each of the supporting substrate 1, the lower electrode LE, the insulating film IL, the upper electrode UE, the alignment film AL1, the alignment film AL2 and the supporting substrate 2 has the property that allows the visible light to penetrate therethrough.

The liquid crystal layer LQ1 is formed above the upper electrode UE and the lower electrode LE, is made of nematic liquid crystal, and is made of positive or negative liquid crystal. A power supply controller PS is arranged out of the liquid crystal diffraction grating 100, and the upper electrode UE and the lower electrode LE are electrically connected to the power supply controller PS through a switch element SW. When the switch element is turned ON, a predetermined voltage is applied to the upper electrode UE and the lower electrode LE so that the alignment directions of the liquid crystal molecules contained in the liquid crystal layer LQ1 change from the initial alignment state.

Note that the switch element SW may be formed out of the liquid crystal diffraction grating 100 as similar to the power supply controller PS. However, a thin film transistor (TFT) may be formed inside the liquid crystal diffraction grating 100 (inside the substrate SUB1) so that this TFT is used as the switch element SW.

<Operation of Liquid Crystal Diffraction Grating 100>

In the liquid crystal diffraction grating 100 according to the first embodiment, the branch electrode UE1 having the comb-teeth shape and the lower electrode LE having the planar shape are formed in different layers from each other. At the time of the voltage application, the liquid crystal molecules of the liquid crystal layer LQ1 rotate to be oriented in a direction that is parallel to the upper surface of the substrate SUB1 or the substrate SUB2, that is, a direction that is parallel to the horizontal plane made by the X direction and the Y direction.

Figure 4:
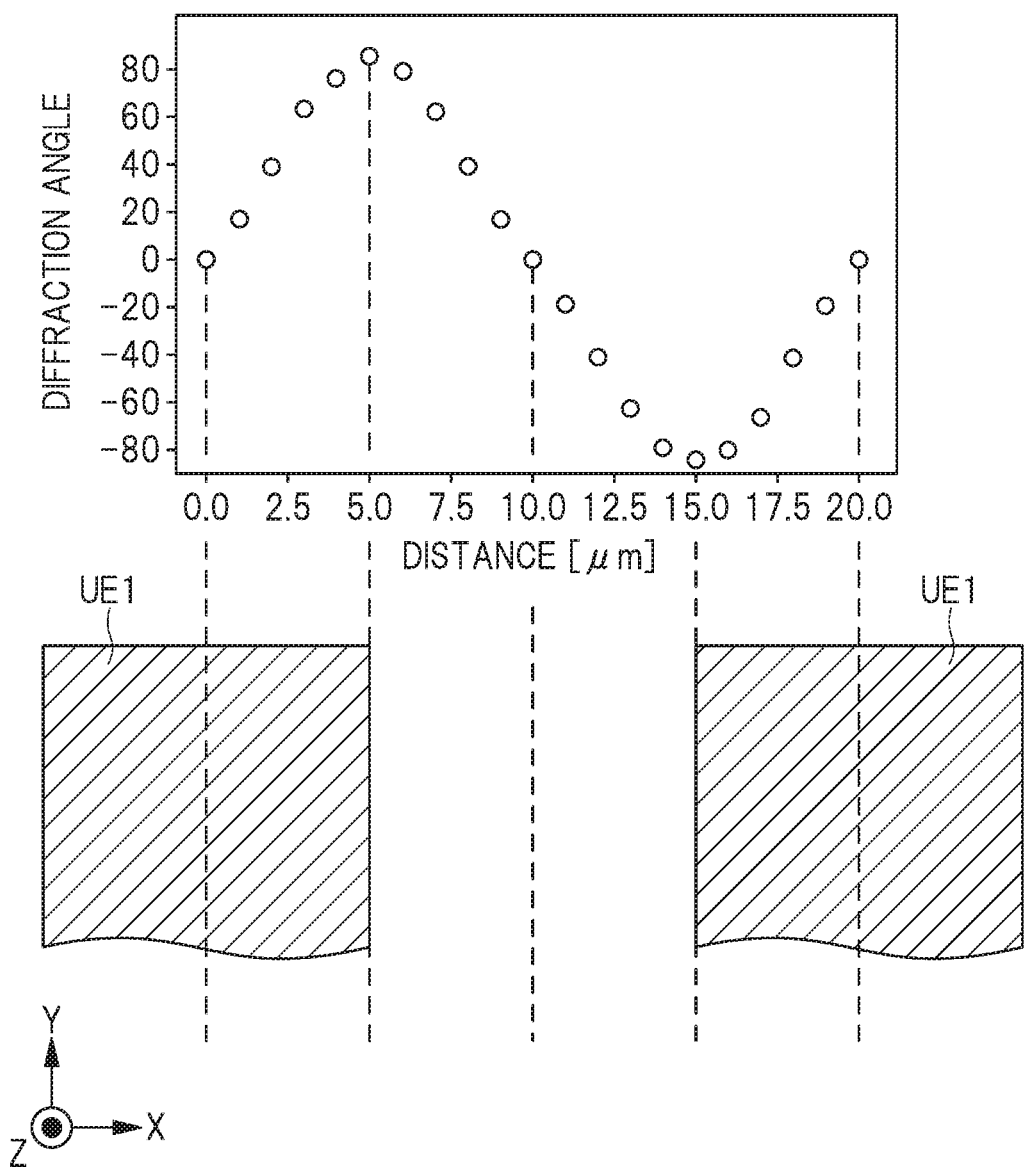
FIG. 4 is a graph showing a relation between a diffraction angle and a distance of light according to the first embodiment.

FIG. 4 shows a graph of a light diffraction angle in a case of the application of the predetermined voltage to the upper electrode UE1 and the lower electrode LE so as to change the alignments of the liquid crystal molecules contained in the liquid crystal layer LQ1 from the initial alignment. A vertical axis indicates a diffraction angle of the emission light OL1 with respect to the incident light IL, and a horizontal axis indicates a distance from center of one (left) upper electrode UE1 to center of the other (right) upper electrode UE1. In order to easily understand a position on the horizontal axis of the graph, FIG. 4 shows a positional relation between each point of the graph and each portion of the two upper electrodes UE1 by using a dashed line.

In the first embodiment, note that pitches between the branch electrodes UE1 (UE2) in the X direction are equalized to one another. The pitch described here is defined by a sum of a width of one branch electrode UE1 (UE2) in the X direction and a distance between two branch electrodes UE1 (UE2) that are the closest to each other in the X direction. Each of the width of one branch electrode UE1 (UE2) and the distance between two branch electrodes UE1 (UE2) in the X direction is, for example, 10 µm.

FIG. 5 shows a state of a liquid crystal molecule LQM obtained before the voltage application (initial alignment) and a state of the liquid crystal molecule LQM obtained after the voltage application. Note that the liquid crystal layer LQ1 is the negative liquid crystal or the positive liquid crystal, and the first embodiment exemplifies the negative liquid crystal case of the liquid crystal layer LQ1. In this case, as shown in FIG. 5, the initial alignment direction of the liquid crystal molecule LQM is the (X) direction that is orthogonal to the direction in which the branch electrode UE1 extends.

As shown in FIG. 5, in the X direction, the alignment directions (alignment angles) of the liquid crystal molecules LQM continuously change in a portion between the center of one (left) branch electrode UE1 and the center of the other (right) branch electrode UE1. That is, after the voltage application, the alignment directions of the liquid crystal molecules LQM continuously change in the X direction.

While the liquid crystal molecules LQM around an end of the one (left) branch electrode UE1 rotate to be oriented in a clockwise (right-hand) direction "R", and the liquid crystal molecules LQM around an end of the other (right) branch electrode UE1 rotate to be oriented in a counterclockwise (left-hand) direction "L". While a portion having the largest change in the alignment directions of the liquid crystal molecules LQM is around the end of the branch electrode UE1, the end of the one (left) branch electrode UE1 and the end of the other (right) branch electrode UE1 are opposite to each other in the rotation directions of the liquid crystal molecules LQM.

When the liquid crystal layer LQ1 is made of the positive liquid crystal state, each initial alignment direction of the liquid crystal molecules LQM is the (Y) direction in which the branch electrode UE1 extends. The rotation directions of the liquid crystal molecules LQM made of the positive liquid crystal are the same as those of the negative liquid crystal case. Therefore, when the liquid crystal layer LQ1 is made of the positive liquid crystal, the alignment directions of the liquid crystal molecules LQM continuously change in the Y direction after the voltage application.

Figure 6:
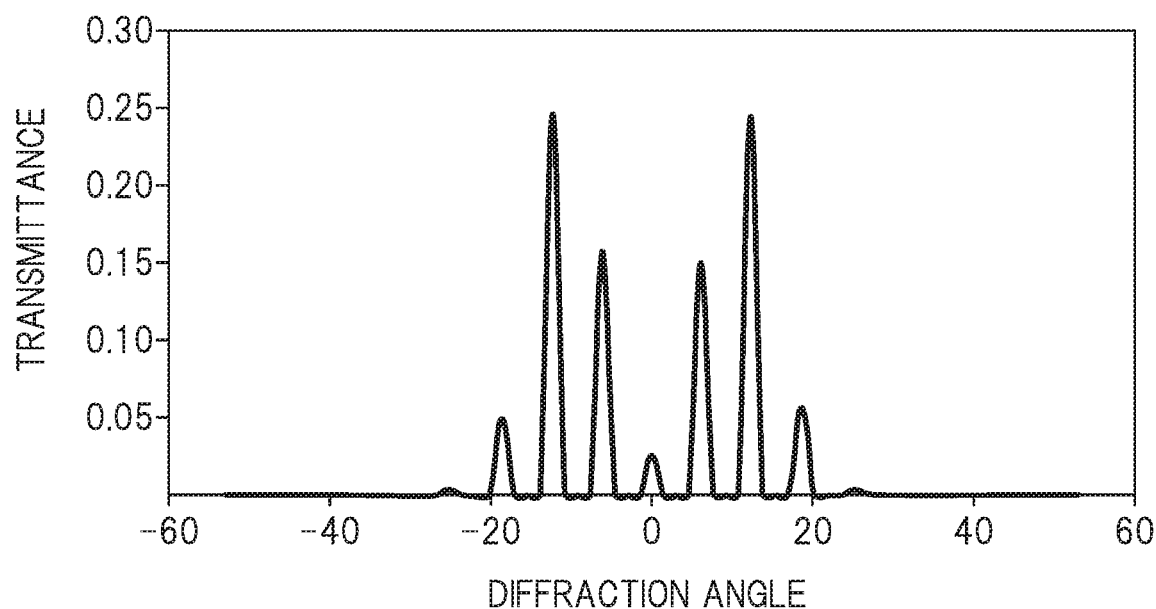
FIG. 6 is a graph showing a relation between a transmittance and a diffraction angle of light according to the first embodiment.

FIG. 6 shows a relation between a light diffraction angle shown in FIG. 4 and a transmittance. As seen from FIG. 6, the light within the diffraction angle range of about ±20 degrees is easy to penetrate as the emission light OL1 through the liquid crystal diffraction grating 100.

Figure 7:
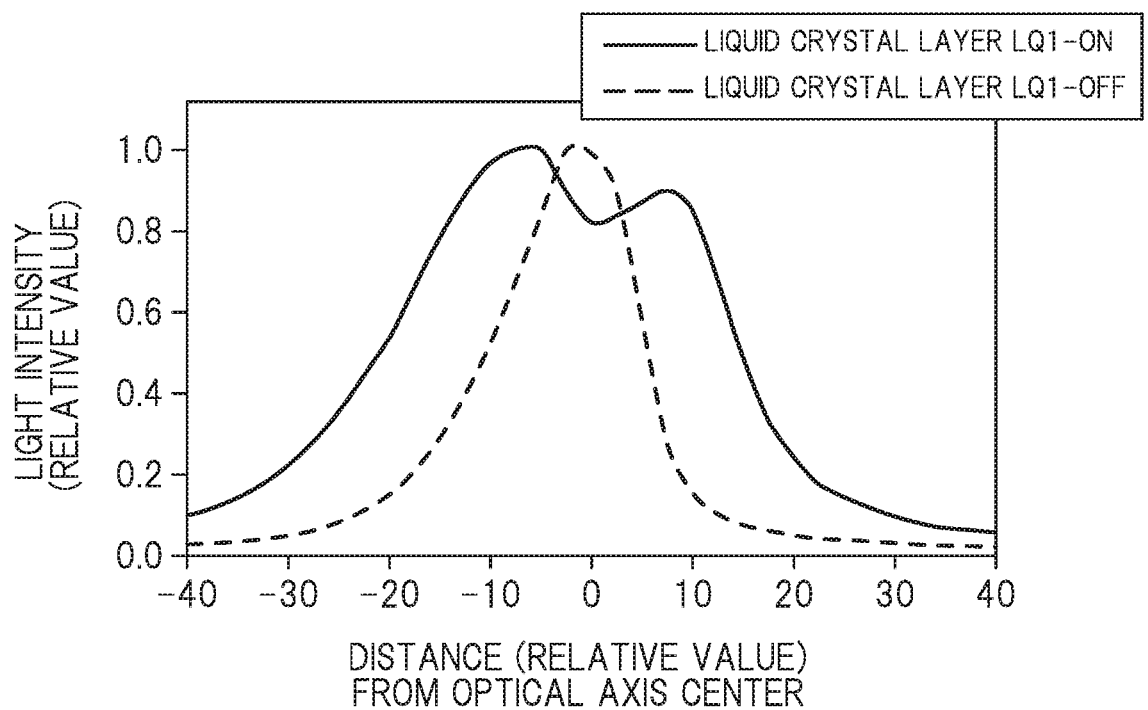
FIG. 7 is a graph showing a relation between an intensity and a distance of light according to the first embodiment.
Figure 8:
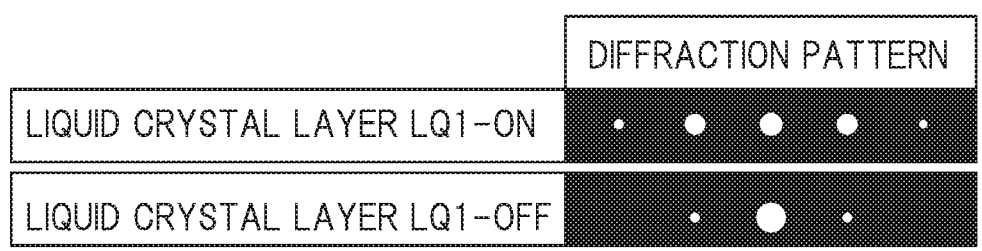
FIG. 8 is a schematic view showing a diffraction pattern according to the first embodiment.

FIG. 7 shows a relation between a light intensity at a predetermined position above the liquid crystal diffraction grating 100 and its distance from center of the light source. Note that relative values are shown on a vertical axis and a horizontal axis in FIG. 7. FIG. 8 shows the light intensity in FIG. 7 as a diffraction pattern. FIGS. 7 and 8 show the light intensities and diffraction patterns obtained before the voltage application (the liquid crystal layer LQ1: OFF) and after the voltage application (the liquid crystal layer LQ1: ON).

Before the voltage application, although a part of the incident light IL being emitted from the backlight unit BLU is diffracted, most of the incident light is not diffracted but penetrate through the liquid crystal diffraction grating 100. That is, the light intensity of a portion around the center of the light source is high.

On the other hand, after the voltage application, the emission light OL1 is mainly configured of light that is diffracted at an angle as shown in FIG. 6. Therefore, a light intensity of a region that is slightly distant from the center of the light source is the highest. The diffraction light also contains a light component (0-th order light) of the center of the light source. That is, when the liquid crystal diffraction grating 100 according to the first embodiment is used, the viewing angle of the emission light OL1 can be widened.

By simple change in a state of the voltage application to the liquid crystal diffraction grating 100, the viewing angle of the emission light OL1 can be widened or narrowed. And, by simple switching of the switch element SW shown in FIG. 3, the viewing angle is changed. That is, by usage of the liquid crystal liquid diffraction grating 100, the viewing angle can be easily changed.

In the first embodiment, each pitch of the branch electrode UE1 (UE2) in the X direction is the same as shown in FIG. 2 or 4. However, a partial pitch of the plurality of branch electrodes UE1 (UE2) may be different. For example, a pitch of a branch electrode UE1 (UE2) at a center portion of the transparent region TR can be narrowed, while a pitch of a branch electrode UE1 (UE2) at an edge portion of the transparent region TR, the edge portion being closer to the non-transparent region NTR, can be widened. Alternatively, a relation in these pitches can be inversed.

By such partial pitch change, the light diffraction angle at each portion is different. Therefore, at the time of the voltage application, a plurality of viewing angles having different angles from one another can be obtained. That is, in response to a demand of a user who uses the liquid crystal diffraction grating 100, the liquid crystal diffracting grating 100 generating different viewing angles at certain positions can be provided.

First Modification Example

In a first modification example, the liquid crystal diffraction grating 100 explained in the first embodiment is adopted as a partial member of the display apparatus DSP.

Figure 9:
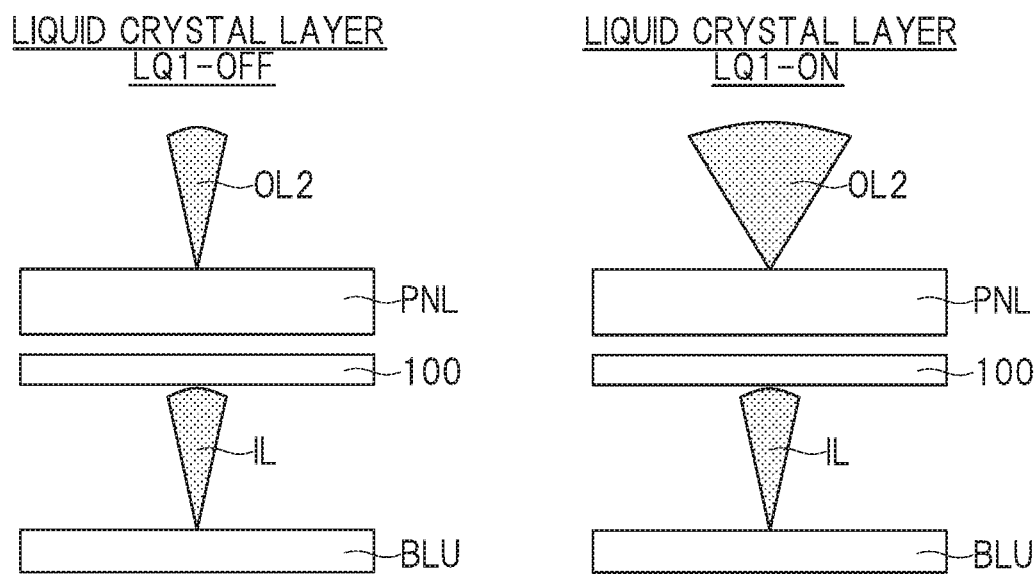
FIG. 9 is a schematic view showing a display apparatus according to a first modification example.

FIG. 9 schematically shows the state in the change of the viewing angle in a case of the liquid crystal diffraction grating 100 arranged between the backlight unit BLU and the panel PL included in the display apparatus DSP.

As shown in FIG. 9, since the liquid crystal diffraction grating 100 is included in the display apparatus DSP, a viewing angle of emission light OL2 that is emitted from the panel PL after the voltage application (liquid crystal layer LQ1: ON) is wider than that before the voltage application (liquid crystal layer LQ1: OFF). And, when the user who uses the display apparatus DSP would like to widen the viewing angle or narrow the viewing angle, the user can easily immediately change the viewing angle by simply changing the state of the voltage application to the liquid crystal diffraction grating 100. That is, according to the first modification example, the performance of the display apparatus DSP can be improved.

Hereinafter, a detailed structure of such a display apparatus DSP will be explained.

<Structure of Display Apparatus DSP>

Figure 10:
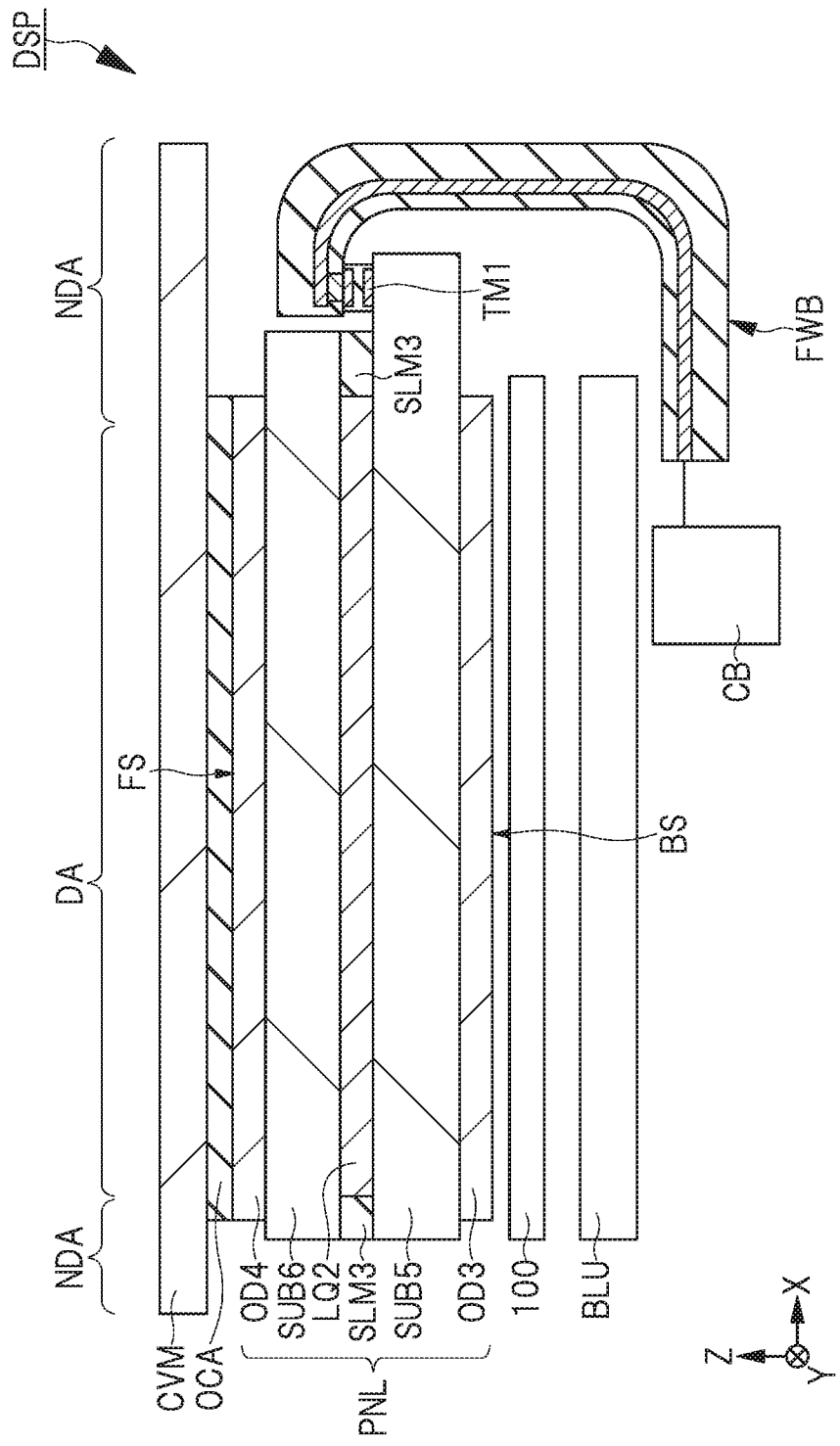
FIG. 10 is a cross-sectional view showing the display apparatus according to the first modification example.

FIG. 10 is a cross-sectional view showing the display apparatus (electric optical apparatus, liquid crystal display apparatus) DSP according to the first embodiment. The display apparatus DSP includes the panel PNL, a wiring board FWB and a circuit board CB as main components. The display apparatus DSP according to the first embodiment is also defined as an electronic device (such as a smartphone, a tablet terminal device or a monitor) including the backlight unit BLU, a camera module and others.

As shown in FIG. 10, the panel PNL includes a display region DA where an image is formed in response to an input signal that is supplied from outside of the display apparatus DSP and a non-display region NDA positioned at an edge portion of the display region DA. In the non-display region DNA, the panel PNL is electrically connected to the wiring board (flexible wiring board) FWB, the circuit board CB and others.

The wiring board FWB and the circuit board CB are bent toward a backside of the backlight unit BLU. Therefore, the wiring board FWB and the circuit board CB are not practically visually recognized in a plan view that is viewed from a normal direction (Z direction) of the display region DA.

In the display region DA, the panel PNL includes a substrate SUB5, a substrate SUB6 formed above the substrate SUB5, and a liquid crystal layer (electric optical layer) LQ2 formed between the substrate SUB5 and the substrate SUB6. The substrate SUB5 and the substrate SUB6 face each other in the Z direction. The liquid crystal layer LQ2 is formed inside a sealing SLM3 that bonds a front surface of the substrate SUB5 and a back surface of the substrate SUB6.

The panel PNL according to the first embodiment includes a polarizer OD3 and a polarizer OD4. The polarizer OD3 is formed below the substrate SUB5, while the polarizer OD4 is formed above the substrate SUB6. In other words, the polarizer OD3 is formed on a back surface side of the substrate SUB5, while the polarizer OD4 is formed on a front surface side of the substrate SUB6. Each of the polarizer OD3 and the polarizer OD4 may include a phase shift plate if needed.

In the display region DA, the front surface side of the substrate SUB6 becomes a front surface side of the panel PNL (display apparatus DSP). In the first embodiment, the front surface of the panel PNL is shown as a front surface FS, while a back surface of the panel PNL is shown as a back surface BS.

Below the back surface BS of the panel PNL, the backlight unit BLU is formed through the polarizer OD3. The backlight unit BLU has a function of emitting the light in a direction from the substrate SUB5 to the substrate SUB6.

Above the front surface FS of the panel PNL, a cover member CVM is formed through an adhesive layer (optical bonding tape) OCA so as to cover the display surface of the display apparatus DSP. The cover member CVM is a member for use in protecting the panel PNL, and is made of, for example, glass.

In the non-display region NDA, the substrate SUB5 and the substrate SUB6 are bonded to each other through a sealing member SLM3. The sealing member SLM3 also plays a role of sealing liquid crystals becoming the liquid crystal layer LQ2 between the substrate SUB5 and the substrate SUB6.

The wiring board FWB is formed at a position that overlaps the backlight unit BLU in a plan view, and is electrically connected to a terminal TM1 formed on the substrate SUB5. The circuit board CB is formed at a position that overlaps the backlight unit BLU in a plan view as similar to the wiring board FWB, and is electrically connected to an internal wiring of the wiring board FWB.

Figure 11:
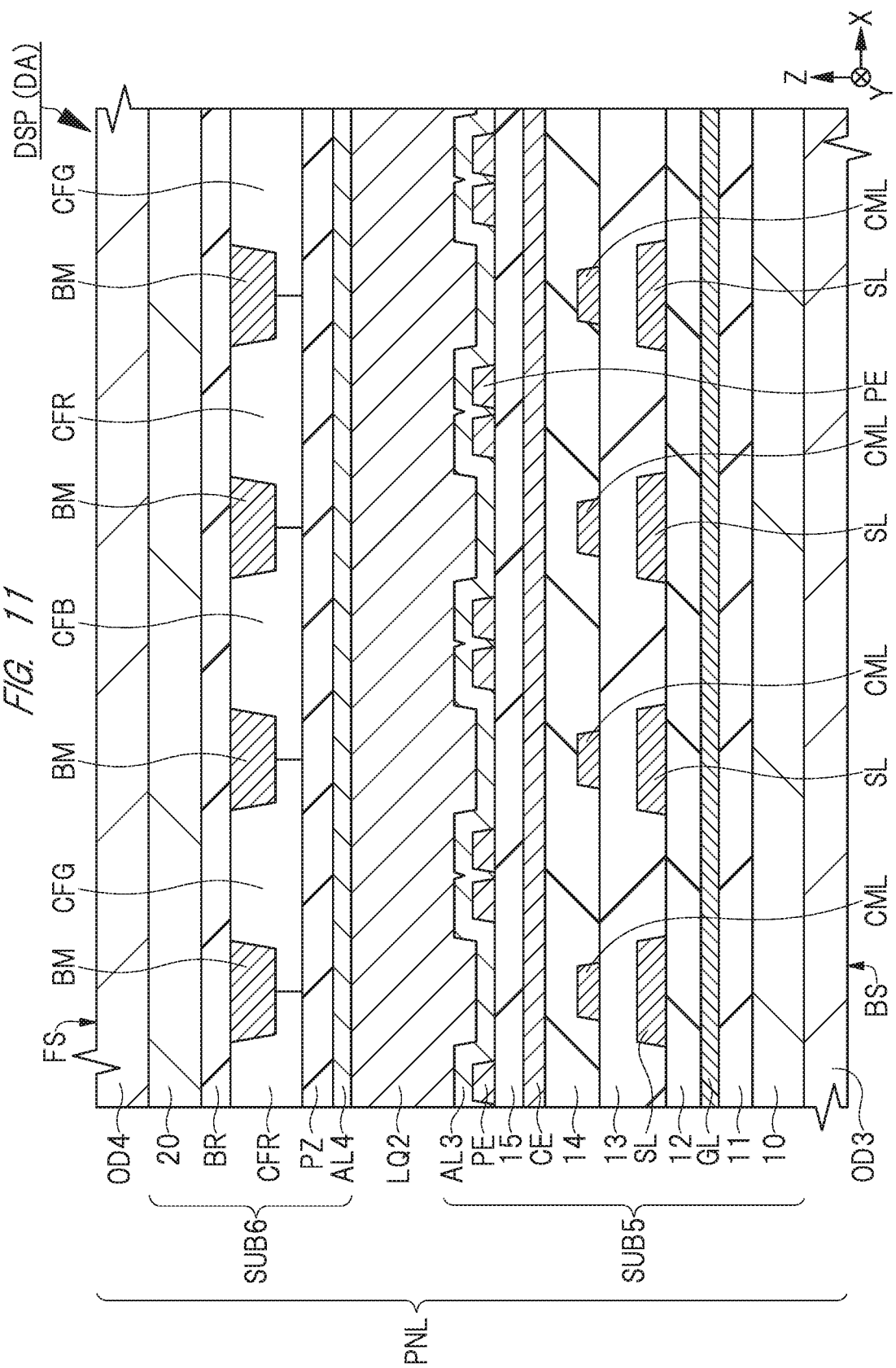
FIG. 11 is a cross-sectional view of a principal part showing the display apparatus according to the first modification example.

FIG. 11 is a cross-sectional view of a partially-enlarged principal part of the display region DA, and shows a detailed internal structure of the substrate SUB5 and the substrate SUB6 in the display region DA. And, a gate line GL, a source line SL, a common electrode CE, a common signal line CML and a pixel electrode PE, that are described later, are practically formed in different cross sections in some cases. However, a concept of FIG. 11 is to show a positional relation among these elements in the Z direction.

First, the detailed structure of the substrate SUB5 formed above the polarizer OD3 in the panel PNL will be explained. The substrate SUB5 includes a supporting substrate (insulating substrate) 10 having a property that allows the visible light to penetrate therethrough. The supporting substrate 10 is made of, for example, a glass substrate.

Above the supporting substrate 10, an insulating film 11 made of an inorganic material is formed. The insulating film 11 is, for example, a single-layer film made of a silicon nitride (SiN) film, a silicon oxide (SiO) film, a silico oxynitride (SiON) film or an aluminum oxide (AlOx) film, or a layered film formed by appropriately layering these films. Each of these films has an effect of preventing penetration of moisture, and functions as a barrier film.

Above the insulating film 11, the gate line GL is formed as a first conductive layer. The gate line GL is, for example, a metallic film containing molybdenum (Mo) or tungsten (W) as a main component and having a light blocking property. Note that the gate line GL is electrically connected to a gate electrode of a transistor. Alternatively, the gate line GL configures the gate electrode of the transistor in some cases.

Above the insulating film 11, an insulating film 12 made of an inorganic material is formed so as to cover the gate line GL. The material making up the insulating film 12 is the same as that of the insulating film 11. Between the insulating film 11 and the insulating film 12, a transistor including the gate electrode, the semiconductive layer and others is formed.

Above the insulating film 12, the source line SL is formed as a second conductive layer. The source line SL is a metallic film having a light blocking property, and is, for example, a layered film formed by layering an aluminum (Al) film, a titanium (Ti) film and a titanium nitride (TiN) film. Note that the source line SL is electrically connected to a source electrode of the transistor. Above the insulating film 12, an insulating film 13 is formed so as to cover the source line SL. The insulating film 13 is an organic insulating film such as an acrylic resin film, and is made of a photosensitive resin material.

Above the insulating film 13, a common signal line CML is formed as a third conductive layer. The common signal line CML is a wiring that is connected to the common electrode CE described later so as to be used for supplying a common potential or a touch detection potential to the common electrode CE. A material making up the common signal line CML is the same as that of the source line SL. Above the insulating film 13, an insulating film 14 made of an organic material is formed so as to cover the common signal line CML. A material making up the insulating film 14 is the same as that of the insulating film 13. Each of the insulating film 13 and the insulating film 14 plays a role of a planarizing film.

Above the insulating film 14, the common electrode CE is formed as a fourth conductive layer. The common electrode CE is made of, for example, a metallic oxide made of a conductive material having high transparency such as ITO or IZO to have conductivity. The common electrode CE is an electrode for use in driving a pixel electrode PE and liquid crystal LQ2 described later, and also has a function of a touch detection electrode when the panel PNL configures a touch panel although not explained in detail. Above the insulating film 14, an insulating film 15 made of an inorganic material is formed so as to cover the common electrode CE. A material making up the insulating film 15 is the same as that of the insulating film 11. The insulating film 15 is a capacitive insulating film between the pixel electrode PE and the common electrode CE.

Above the insulating film 15, the pixel electrode PE is formed as a fifth conductive layer. A material making up the pixel electrode PE is the same as that of the common electrode CE. In the first embodiment, a plurality of pixel electrodes PE are positioned between two source lines SL that are adjacent to each other in a plan view. Above the insulating film 15, an alignment film AL3 that is an organic insulating film is formed so as to cover the pixel electrode PE. The alignment film AL3 has a function of equalizing initial alignment directions of liquid crystal molecules contained in the liquid crystal layer LQ2, and is made of, for example, a resin material such as polyimide. The alignment film AL3 is in contact with the liquid crystal layer LQ2.

Note that the gate line GL, the source line SL, the common signal line CML, the common electrode CE and the pixel electrode PE are electrically connected to the wiring board FWB and the circuit board CB through the terminal TM1 shown in FIG. 10.

Next, the detailed structure of the substrate SUB6 formed below the polarizer OD4 in the panel PNL will be explained. The substrate SUB6 includes a supporting substrate (insulating substrate) 20 having a property that allows the visible light to penetrate therethrough. The supporting substrate 20 is, for example, a glass substrate.

A barrier film BR, a light blocking film (black matrix) BM, a color filter CFR, a color filter CFG, a color filter CFB, a planarizing film PZ and an alignment film AL4 are formed between the supporting substrate 20 and the liquid crystal layer LQ2.

The barrier film BR is formed above an entire back surface of the supporting substrate 20. The barrier film BR is an inorganic insulating film made of an inorganic material containing at least one of, for example, silicon nitride, silicon oxide, silicon oxynitride and aluminum oxide. The barrier film BR is formed for preventing penetration of moisture existing out of the supporting substrate 20, into the color filters CFR, CFG and CFB, the liquid crystal layer LQ2 or others when the moisture penetrates into the supporting substrate 20. However, the substrate SUB6 may have a structure without the barrier film BR.

On a back surface side of the supporting substrate 20, three color filters (color converting layer) are formed through the barrier film BR. In the first embodiment, a red (R) color filter CFR, a green (G) color filter CFG and a blue (B) color filter CFB are cyclically arranged. In the display apparatus DSP, a color image is displayed when, for example, pixels of three colors that are red (R), green (G) and blue (B) are combined as one set. The plurality of color filters CFR, CFG and CFB of the substrate SUB6 are arranged at positions so that the color filters face pixels PX including the pixel electrode PE formed in the substrate SUB5. Note that the color filter types are not limited to the three colors that are red (R), green (G) and blue (B). Each of the color filters CFR, CFG and CFB of the first embodiment includes the color converting layer that can change a wavelength of light penetrating therethrough.

The light blocking film BM is arranged on each boundary among the plurality of color filters CFR, CFG and CFB. The light blocking film BM is made of, for example, a black resin or a metal having low reflectance. In a plan view, the light blocking film BM is formed so as to have, for example, a grid form in the display region DA. In other words, the light blocking film BM extends in the X direction and the Y direction, and has openings at positions that overlap the pixel electrodes PE in a plan view. In this manner, when each pixel PX is partitioned by the light blocking film BM, light leakage and occurrence of color mixture can be suppressed in each of the color filters CFR, CFG and CFB. Generally, an edge of an end-side opening among the openings of the light blocking film BM is defined as the boundary between the display region DA and the non-display region NDA.

On the back surface side of the supporting substrate 20, the planarizing film PZ covers the color filters CFR, CFG and CFB. The planarizing film PZ is a protection film for use in preventing dispersion of impurities from the color filters CFR, CFG and CFB to the liquid crystal layer LQ2, and is an insulating film that cancels a step level difference between each color filter and the light blocking film. The planarizing film PZ is made of an organic resin material. The planarizing film PZ is also called overcoat film.

The alignment film AL4 is in contact with the liquid crystal layer LQ2, and is formed between the liquid crystal layer LQ2 and the planarizing film PZ. The alignment film AL4 is made of the same material as that of the alignment film AL3, and has the same function as that of the alignment film AL3.

In the above-described configurations, each of the supporting substrate 10, the insulating films 11 to 15, the common electrode CE, the pixel electrode PE, the alignment film AL3, the alignment film AL4, the planarizing film PZ, the barrier film BR and the supporting substrate 20 has a property that allows the visible light to penetrate therethrough. In the above-described configurations, each of the gate line GL, the source line SL, the common signal line CML and the light blocking film BM has a property that does not allow the visible light to penetrate therethrough.

In the first embodiment, the case of the usage of the display apparatus DSP for the smartphone or others has been exemplified. However, the intended use of the display apparatus DSP is not limited to this, and the intended use of the display apparatus DSP includes a case of usage of a shutter liquid crystal element for use in controlling the light transmission, that is used for a room mirror of a car or others.

As described above, the liquid crystal diffraction grating 100 is applicable as a partial member of the display apparatus DSP as described above. Since a main purpose of the usage of the liquid crystal diffraction grating 100 is to diffract the light to widen the viewing angle, the transparent region TR of the liquid crystal diffraction grating 100 is not provided with a structure that does not allow the visible light to penetrate therethrough, such as the gate line GL, the source line SL and the common signal line CML that are included in the display apparatus DSP. In the liquid crystal diffraction grating 100, the color classification as performed in the display apparatus DSP is unnecessary, and therefore, the transparent region TR of the liquid crystal diffraction grating 100 is not provided with the plurality of color filters CFR, CFG and CFB and the light blocking film BM.

Second Embodiment

With reference to FIGS. 12 to 15, a liquid crystal diffraction grating 200 will be explained below as one example of an optical element in a second embodiment. Note that differences from the first embodiment will be mainly explained below.

Figure 12:
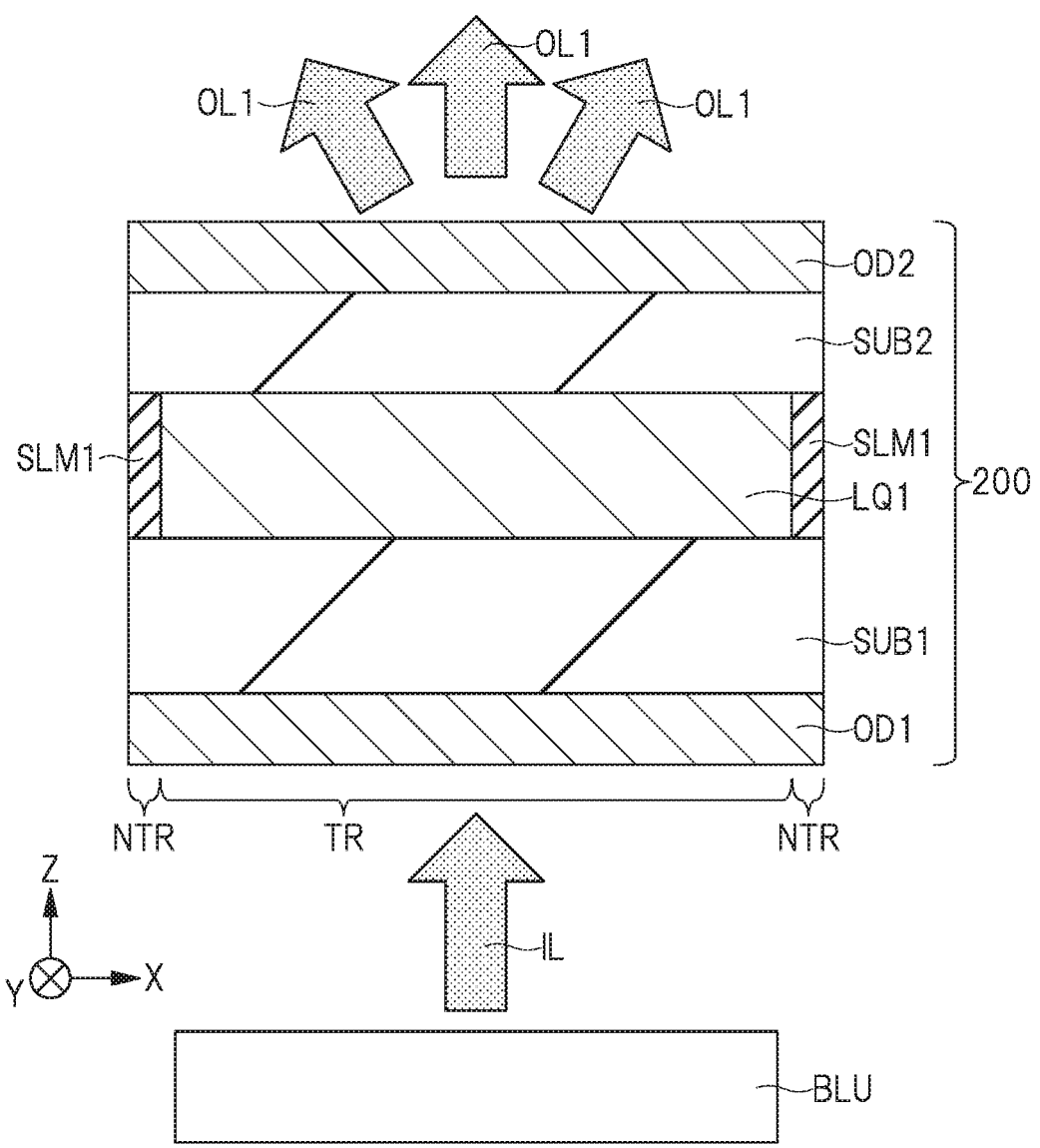
FIG. 12 is a schematic view showing a liquid crystal diffraction grating according to a second embodiment.

As shown in FIG. 12, the liquid crystal diffraction grating 200 in the second embodiment includes a polarizer OD1 arranged below the substrate SUB1 and a polarizer OD2 arranged above the substrate SUB2 in addition to the structure of the liquid crystal diffraction grating 100 in the first embodiment. That is, the substrate SUB1, the liquid crystal layer LQ1 and the substrate SUB2 are arranged between the polarizer OD1 and the polarizer OD2. A transmission axis of each of the polarizers OD1 and OD2 is parallel or orthogonal to the initial alignment direction of the liquid crystal molecules LQM of the liquid crystal layer LQ1.

Figure 13:
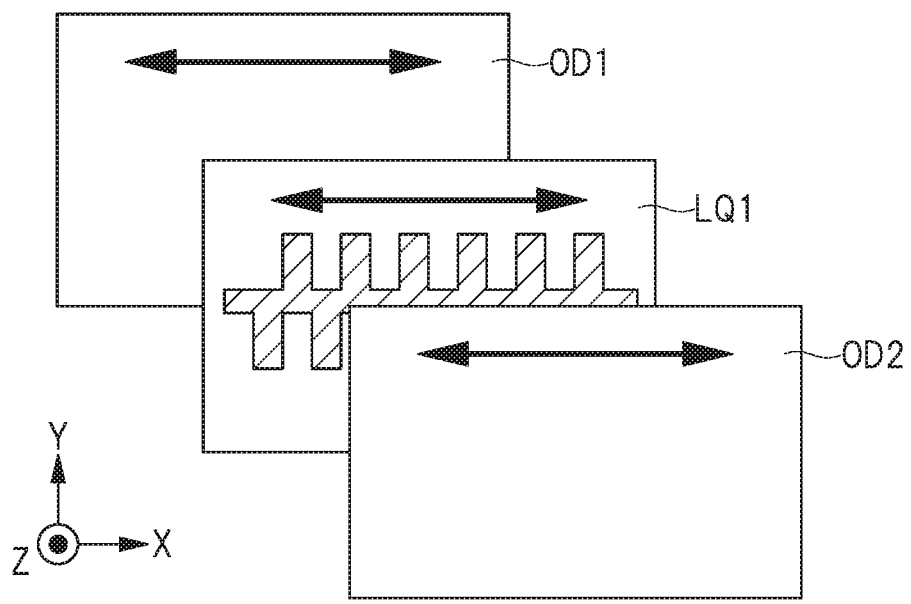
FIG. 13 is a plan schematic view showing the liquid crystal diffraction grating according to the second embodiment.
Figure 14:
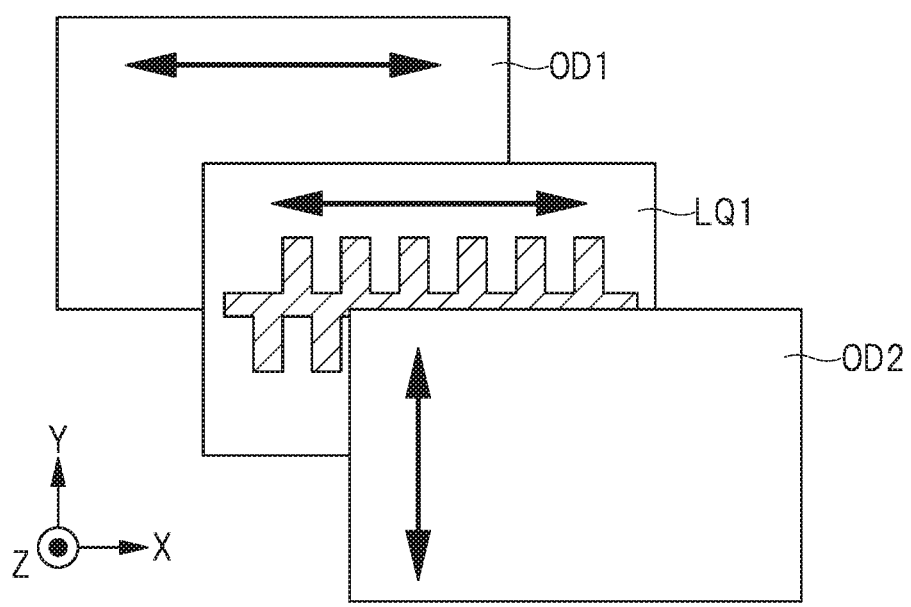
FIG. 14 is a plan schematic view showing the liquid crystal diffraction grating according to the second embodiment.

FIG. 13 shows a case in which the transmission axes of the polarizers OD1 and OD2 are parallel to each other and parallel to the initial alignment direction of the liquid crystal molecules LQM. FIG. 14 shows a case in which the transmission axis of the polarizer OD1 is orthogonal to the transmission axis of the polarizer OD2 but is parallel to the initial alignment direction of the liquid crystal molecules LQM. Arrows of FIGS. 13 and 14 indicate the transmission axis of the polarizer OD1, the initial alignment direction of the liquid crystal molecules LQM and the transmission axis of the polarizer OD2.

FIG. 15 shows a diffraction pattern of the emission light OL1 in a case of usage of FIG. 13 (the parallel polarizers) and FIG. 14 (the orthogonal polarizers). In the case in which the transmission axes of the polarizers OD1 and OD2 are parallel to each other, the diffraction pattern is almost the same as that in the case explained in FIG. 8 in the first embodiment.

In the case in which the transmission axes of the polarizers OD1 and OD2 are orthogonal to each other, before the voltage application (the liquid crystal layer LQ1: OFF), the diffraction pattern is entirely black as a state without a diffraction spot since the emission light OL1 does not penetrate through the liquid crystal diffraction grating 200. After the voltage application (the liquid crystal layer LQ1: ON), a part of the diffraction light is blocked by the polarizer OD2 while others of the same are emitted as the emission light OL1 from the polarizer OD2. The emission light OL1 that is emitted from the polarizer OD2 is light that has diffracted at a certain diffraction angle.

Because of a waveform shown in FIG. 4, it is understood that there are two light components having the same diffraction angle as each other. However, emission directions of the two light components are different from each other. And, it is obvious that the waveform shown in FIG. 4 repeatedly appears by the number of the plurality of upper electrodes UE1. Therefore, the light components having the same diffraction angle and being emitted in the same direction are emphasized. As a result, as shown in FIG. 15, a diffraction pattern having two high light intensity regions is observed. Ideally, only the two regions appear. However, practically, light leakage slightly occurs, and a weak light intensity spot is observed around the two regions in some cases.

Even when the polarizers OD1 and OD2 are arranged as described above, the viewing angle can be widened, and the viewing angle can be easily changed. And, the present invention can provide the liquid crystal diffraction grating 200 with the different viewing angles depending on either the transmission axes of the respective polarizers OD1 and OD2 being parallel or orthogonal to each other. As shown in the "orthogonal polarizers" of FIG. 15, the present invention can also provide the liquid crystal diffraction grating 200 with the function of emitting or blocking the emission light OL1, and capable of easily changing the emission and the blocking.

Second Modification Example

In a second modification example, the liquid crystal diffraction grating 200 explained in the second embodiment is applied to a partial member of the display apparatus DSP. A structure of the display apparatus DSP is the same as that of the first modification example.

FIG. 16 schematically shows a state of change in the viewing angle in the case of arranging the liquid crystal diffraction grating 200 between the backlight unit BLU and the panel PL in the display apparatus DSP.

The viewing angle in the "parallel polarizers" of FIG. 16 is almost the same as that of FIG. 9 of the first modification example. In the case of the state of the "liquid crystal layer LQ1: OFF" in the "orthogonal polarizers" of FIG. 16, the emission light OL1 does not penetrate through the liquid crystal diffraction grating 200, and therefore, the emission light OL2 does not appear. In the case of the state of the "liquid crystal layer LQ1: ON" in the "orthogonal polarizers" of FIG. 16, the emission light OL2 is emitted in directions corresponding to the diffraction spots at the above-described two regions.

Since the display apparatus DSP is provided with the liquid crystal diffraction grating 200 as described above, the viewing angle of the emission light OL2 that is emitted from the panel PL is widened at the time of the voltage application. By simple change in the state of the voltage application to the liquid crystal diffraction grating 200, the change in the viewing angle of the emission light OL2 or the emission/blocking of the emission light OL2 or others can be easily adjusted. Therefore, in the second embodiment, the performance of the display apparatus DSP can be further improved than that of the first embodiment.

Third Embodiment

With reference to FIGS. 17 to 20, a liquid crystal diffraction grating 300 will be explained below as one example of an optical element of a third embodiment. Note that differences from the second embodiment will be mainly explained below. The concepts of FIGS. 17 to 20 are the same as the concepts of FIGS. 12 to 15 in the second embodiment.

Figure 17:
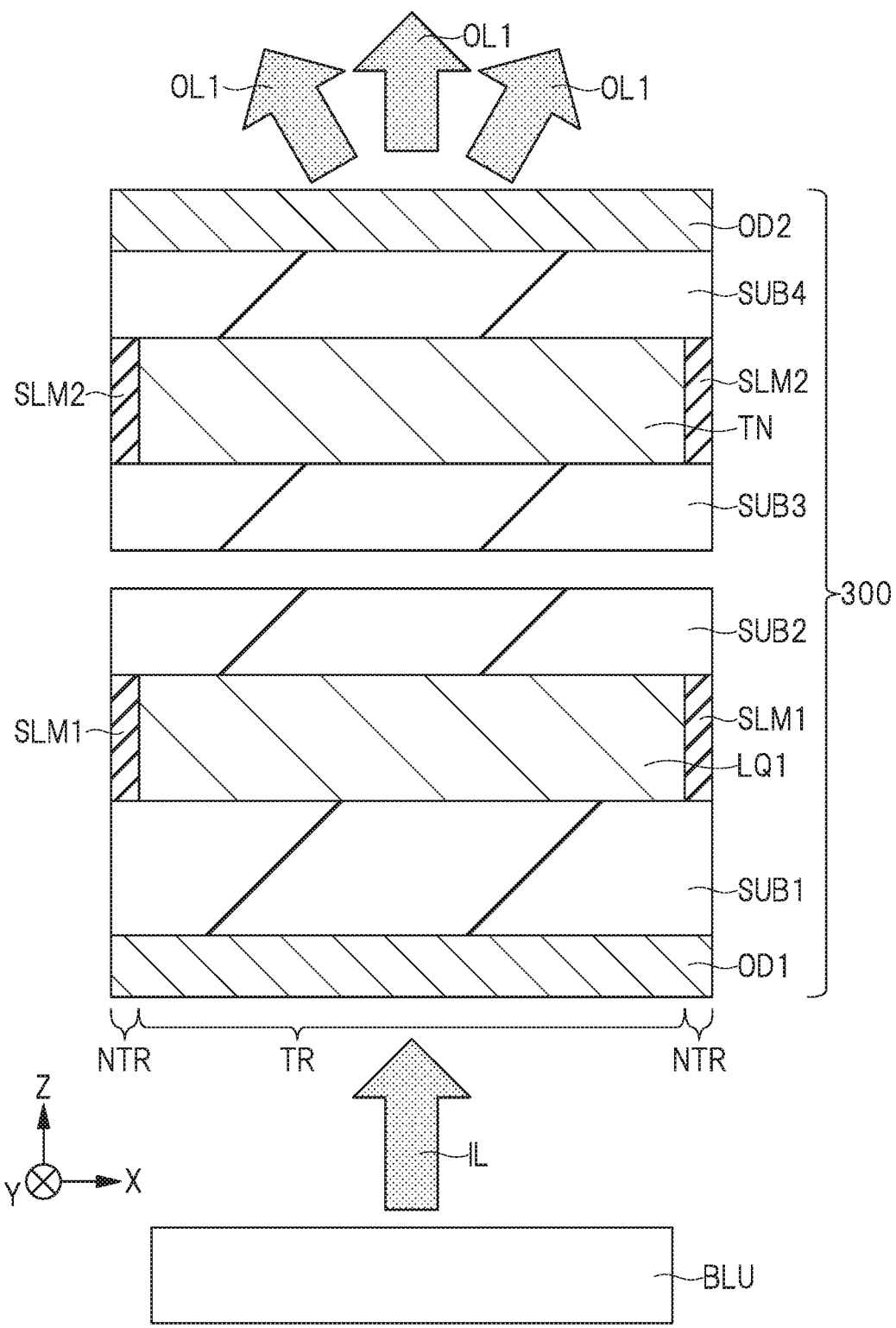
FIG. 17 is a schematic view showing a liquid crystal diffraction grating according to a third embodiment.

As shown in FIG. 17, the liquid crystal diffraction grating 300 in the third embodiment is provided with a substrate SUB3, a light polarization converting element TN and a substrate SUB4 between the substrate SUB2 and the polarizer OD2 in addition to the structure of the liquid crystal diffraction grating 200 in the second embodiment.

Respective structures of the substrates SUB3 and SUB4 are almost the same as the structures of the substrates SUB1 and SUB2, but are slightly different in the rubbing treatment or others performed to the alignment films AL1 and AL2. A lower electrode (not illustrated) is formed in the substrate SUB3, and an upper electrode (not illustrated) is formed in the substrate SUB4.

The light polarization converting element TN is an element having a function of rotating the polarized light by 90 degrees, and is made of, for example, a TN (Twisted Nematic) liquid crystal layer. Although not illustrated in detail, the switch element SW and the power supply controller PS as shown in FIG. 3 are also electrically connected to the substrates SUB3 and SUB4. The polarized light in the light polarization converting element TN is changed by the state of the voltage application to the lower electrode of the substrate SUB3 and the upper electrode of the substrate SUB4.

In a state of no voltage application, the liquid crystal molecules of the light polarization converting element TN on the substrates SUB3 and SUB4 are oriented so as to twist from each other by 90 degrees. In the state of the voltage application, the liquid crystal molecules of the light polarization converting element TN standup in a vertical direction, so that the light that enters into the light polarization converting element TN is hardly diffracted and penetrates through the light polarization converting element TN.

In order to seal the light polarization converting element TN and improve adhesiveness between the substrates SUB3 and SUB4, a sealing member SLM2 is formed between the substrates SUB3 and SUB4. The sealing member SLM2 does not have the transparency that allows the visible light to penetrate therethrough as similar to the sealing member SLM1. Therefore, the transparent region TR and the non-transparent region NTR in each of the liquid crystal layer LQ1 and the light polarization converting element TN preferably exist in the same range. However, they may be shift from each other.

Figure 18:
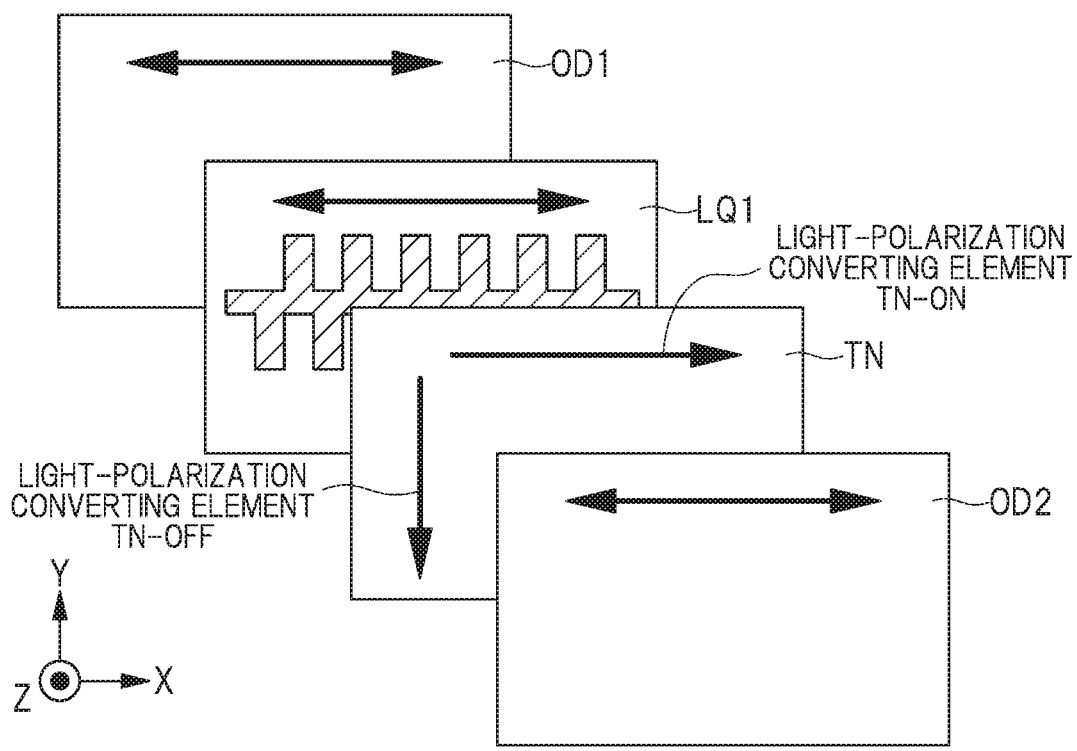
FIG. 18 is a plan schematic view showing the liquid crystal diffraction grating according to the third embodiment.
Figure 19:
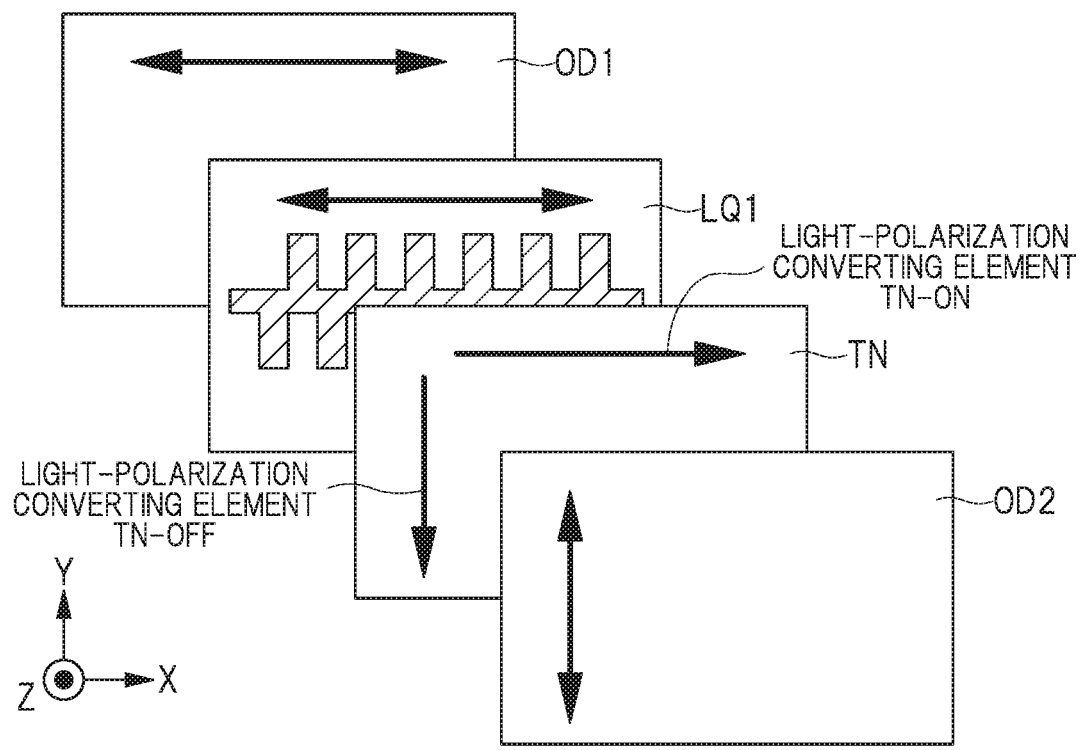
FIG. 19 is a plan schematic view showing the liquid crystal diffraction grating according to the third embodiment.

FIG. 18 shows the case in which the transmission axes of the polarizers OD1 and OD2 are parallel to each other, and FIG. 19 shows the case in which the transmission axes of the polarizers OD1 and OD2 are orthogonal to each other. The alignment of the liquid crystal molecules of the light polarization converting element TN depends on the state of the voltage application to each electrode of the substrates SUB3 and SUB4.

FIG. 20 shows the diffraction pattern of the emission light OL1 in the case of FIG. 18.

In the state of no voltage application (the light polarization converting element TN: OFF) to each electrode of the substrates SUB3 and SUB4 in addition to the state of no voltage application (the liquid crystal layer LQ1: OFF) to the upper electrodes UE1 and UE2 and the lower electrode LE of the substrate SUB1, the light that has penetrated through the liquid crystal layer LQ1 is polarized by the light polarization converting element TN by 90 degrees, and therefore, is blocked by the polarizer OD2. Therefore, there is no the diffraction spot, and a diffraction pattern is observed to be entirely black.

In the state of "the light polarization converting element TN: OFF" in addition to the state of voltage application (the liquid crystal layer LQ1: ON) to the upper electrodes UE1 and UE2 and the lower electrode LE of the substrate SUB1, the light that has diffracted on the liquid crystal layer LQ1 is polarized by the light polarization converting element TN by 90 degrees, and therefore, the diffraction pattern having the two high light intensity regions is observed.

In the state of the voltage application (the light polarization converting element TN: ON) to each electrode of the substrates SUB3 and SUB4 in addition to the state of "the liquid crystal layer LQ1: OFF", the incident light IL is almost emitted as the emission light OL1, and a diffraction pattern having the high light intensity around the center of the light source is observed.

In the state of "the light polarization converting element TN: ON" in addition to the state of "the liquid crystal layer LQ1: ON", a diffraction pattern having the highest light intensity at a region slightly distant from the center of the light source is observed.

FIG. 21 shows a diffraction pattern of the emission light OL1 in the case of FIG. 19.

When the transmission axes of the polarizers OD1 and OD2 are orthogonal to each other, as shown in FIG. 21, the diffraction patterns in the state of "the light polarization converting element TN: ON" and the state of "the light polarization converting element TN: OFF" are opposite to those of FIG. 20.

As described above, the arrangement of the light polarization converting element TN can increase the number of the selectable viewing angle types, and easily change the types. And, the present invention can also provide the display apparatus with the function of emitting or blocking the emission light OL1.

Third Modification Example

In a third modification example, a liquid crystal diffraction grating 300 explained in the third embodiment is applied as a partial member of the display apparatus DSP. A structure of the display apparatus DSP is the same as that of the first modification example.

FIG. 22 schematically shows a state of change in the viewing angle in a case of arranging the liquid crystal diffraction grating 300 between the backlight unit BLU and the panel PL included in the display apparatus DSP. This drawing shows the emission light OL1 in a case of combination of the state of "the light polarization converting element TN: ON" or "the light polarization converting element TN: OFF" and the state of "the liquid crystal layer LQ1: OFF" or "the liquid crystal layer LQ1: ON".

Note that this drawing shows the case in which the transmission axes of the polarizers OD1 and OD2 are parallel to each other as shown in FIG. 18. However, when the transmission axes of the polarizers OD1 and OD2 are orthogonal to each other, the viewing angles in the states of "the light polarization converting element TN: ON" and the state of "the light polarization converting element TN: OFF" are opposite to those of FIG. 22.

Since the display apparatus DSP is provided with the liquid crystal diffraction grating 300, a viewing angle width of the emission light OL2 emitted from the panel PL can be selected from three types, and the emission light OL2 can be also blocked. That is, in the third modification example, the switching of the viewing angle of the emission light OL2 and the blocking of the emission light OL2 can be achieved by one liquid crystal diffraction grating 300. Therefore, in the third embodiment, the performance of the display apparatus DSP can be further improved than that of the second embodiment.

In the scope of the concept of the present invention, various modification examples and alteration examples could have been easily anticipated by those who are skilled in the art, and it would be understood that these various modification examples and alteration examples are within the scope of the present invention. For example, the ones obtained by appropriate addition, removal, or design-change of the components to/from/into each of the above-described embodiments by those who are skilled in the art or obtained by addition, omitting, or condition-change of the step to/from/into each of the above-described embodiments are also within the scope of the present invention as long as they include the concept of the present invention.

The present invention is usable for an optical element and a liquid crystal display apparatus including the optical element.

What is claimed is:

1. An optical element comprising:
    a first polarizer;
    a first substrate;
    a first liquid crystal layer;
    a second substrate; and
    a second polarizer, that are sequentially layered,
    wherein the first substrate includes a first electrode and a second electrode opposite to the first electrode,
    the second electrode includes a plurality of branch electrodes extending in a first direction and arranged in a second direction that is orthogonal to the first direction in a plan view,
    when no voltage is applied to the second electrode, an alignment direction of liquid crystal molecules of the first liquid crystal layer is a direction along the first direction or the second direction,
    a transmission axis of the first polarizer and a transmission axis of the second polarizer are parallel to each other, and are parallel to the alignment direction of the liquid crystal molecules,
    the first liquid crystal layer is made of negative liquid crystal,
    the alignment direction of the liquid crystal molecules of the first liquid crystal layer in the case of no voltage application to the second electrode is the direction along the first direction,
    the alignment direction of the liquid crystal molecules of the first liquid crystal layer in a case of voltage application to the second electrode continuously changes in the first direction.

2. An optical element comprising:
    a first polarizer;
    a first substrate;
    a first liquid crystal layer;
    a second substrate; and
    a second polarizer, that are sequentially layered,
    wherein the first substrate includes a first electrode and a second electrode opposite to the first electrode,
    the second electrode includes a plurality of branch electrodes extending in a first direction and arranged in a second direction that is orthogonal to the first direction in a plan view,
    when no voltage is applied to the second electrode, an alignment direction of liquid crystal molecules of the first liquid crystal layer is a direction along the first direction or the second direction,
    a transmission axis of the first polarizer and a transmission axis of the second polarizer are parallel to each other, and are parallel to the alignment direction of the liquid crystal molecules,
    the first liquid crystal layer is made of positive liquid crystal,
    the alignment direction of the liquid crystal molecules of the first liquid crystal layer in the case of no voltage application to the second electrode is the direction along the second direction, and
    the alignment direction of the liquid crystal molecules of the first liquid crystal layer in a case of voltage application to the second electrode continuously changes in the second direction.

3. The optical element according to claim 1 further comprising
    a light polarization converting element having a function of rotating polarized light by 90 degrees, between the first polarizer and the first substrate.

4. The optical element according to claim 3,
    wherein the light polarization converting element includes a third substrate, a second liquid crystal layer and a fourth substrate, and the light polarization converting element is a TN (Twisted Nematic) liquid crystal panel.

5. The optical element according to claim 1,
wherein a pitch that is defined by a sum of a width of one of the second electrodes in the second direction and a distance between two second electrodes that are adjacent to each other in the second direction is partially different in the second direction.

6. The optical element according to claim 1,
wherein the first substrate does not include a plurality of color filters and a light blocking film having a property that does not allow visible light to penetrate therethrough.

7. The optical element according to claim 2,
wherein a pitch that is defined by a sum of a width of one of the second electrodes in the second direction and a distance between two second electrodes that are adjacent to each other in the second direction is partially different in the second direction.

* * * * *